United States Patent
Meyerink et al.

[11] Patent Number: 5,853,063
[45] Date of Patent: Dec. 29, 1998

[54] ENGINE MOUNT FOR MOTOR VEHICLES

[75] Inventors: Frank Meyerink, Lohne; Andreas Vossel, Osnabrück, both of Germany

[73] Assignee: Lemförder Metallwaren AG, Lemförde, Germany

[21] Appl. No.: 690,340

[22] Filed: Jul. 26, 1996

[30]     Foreign Application Priority Data

Jul. 27, 1995 [DE] Germany .................. 195 27 563.2

[51] Int. Cl.$^6$ ........................................ F16F 9/34
[52] U.S. Cl. ............................ 180/300; 248/562
[58] Field of Search .................... 180/291, 299, 180/300, 312, 902; 248/562, 563, 573, 647; 267/140.13

[56]             References Cited

U.S. PATENT DOCUMENTS

| 4,660,813 | 4/1987 | Reuter | 267/140.13 |
| 4,739,962 | 4/1988 | Morita et al. | 267/140.13 |
| 4,997,169 | 3/1991 | Nakamura et al. | 267/140.13 |
| 5,029,824 | 7/1991 | LaBeau et al. | 248/562 |
| 5,356,122 | 10/1994 | Freudenberg et al. | 267/140.13 |

FOREIGN PATENT DOCUMENTS

| 3700589 | 7/1987 | Germany | 180/300 |
| 38 16 445 A1 | 12/1988 | Germany . | |
| 3933252 | 4/1991 | Germany | 267/140.13 |
| 44 35 271 C1 | 11/1995 | Germany . | |

*Primary Examiner*—Brian L. Johnson
*Assistant Examiner*—Frank Vanaman
*Attorney, Agent, or Firm*—McGlew and Tuttle

[57]             ABSTRACT

An engine mount with hydraulic damping for motor vehicles which has at least two chambers, which are provided with at least partially elastically deformable walls in a housing and are filled with a damping fluid. A common valve plate is between the chambers. An uncoupling membrane of an elastic material is arranged in a cage structure with openings. The edge of the uncoupling membrane is inserted radially movably with a gentle pretension or clamping force in a recess between two disks of the valve plate, which are designed as a cage, wherein at least one of these openings is continued radially to the edge of the uncoupling membrane.

19 Claims, 3 Drawing Sheets

ENGINE MOUNT FOR MOTOR VEHICLES

FIELD OF THE INVENTION

The present invention pertains to an engine mount where a housing defines two chambers and a valve plate is positioned between the two chambers. The valve plate contains a membrane which flexes in response to a difference in pressures between the two chambers.

A reduction in noise generation in the engine mount at low vibration amplitudes and low-cost manufacture are achieved in the arrangement due to the oblique limiting surfaces of the uncoupling membrane and its installation without axial clearance.

BACKGROUND OF THE INVENTION

Provisions are made for this purpose in the engine mount embodied in German Patent No. 44 35 271, which is also known from DE 38 16 445-A1, that the edge of the uncoupling membrane is inserted radially movably with a gentle axial pretension in a recess between two disks of a valve plate, which disks are designed as a cage. As a result, the uncoupling membrane can arch into the openings of the cage walls in the case of differences in pressure in the two chambers and it can pull itself out of the gentle edge clamping. After the load has been released, the edge of the uncoupling membrane, which is made of rubber, is automatically pushed to the outside into the gentle clamped position due to the intrinsic elasticity of the material.

SUMMARY AND OBJECTS OF THE INVENTION

The object of the present invention is to improve an engine mount according to the above principal patent such that overstretching of the uncoupling membrane into the openings of the cage and consequently coming abruptly into contact with the wall of the openings are avoided during brief differences in pressure between the chambers.

This object is accomplished according to the present invention by the additional design of passage openings which do not fully clamp completely around an uncoupling membrane. Instead an edge of the membrane is not held by the cage and this free edge is axially movable to open a channel between the first and second chambers. In this way when the engine mount compresses or expands and the walls of the housing elastically deform, pressure build-up in one chamber can cause flow of damping fluid into the other chamber through the passage opening. The other openings in the valve plate or cage have oblique walls and hold the membrane completely around the opening. Differences in pressure between the first and second chambers cause the membrane in the openings to flex in one direction or the other and come into contact with the oblique walls. If the differences in pressure occur rapidly, the membrane holds quickly into contact with the oblique walls and an undesirable noise is generated. The size and shape of the passage opening and the membrane in the passage opening is designed to cause a channel of sufficient magnitude to prevent differences in pressure that would cause the membrane to noisily contact the oblique walls above a predetermined noise level. The membrane can be of constant cross-sectional area, or can be profiled to control the flexing of the membrane. The passage opening can also have a limitation at the edge of the uncoupling membrane which overlaps the edge of the membrane and further effects the movement of the membrane and the corresponding opening of the channel.

In the case of suddenly occurring differences in pressure between the two chambers, this makes possible a controlled pressure equalization between the chambers via an opening channel of the uncoupling membrane in the area of the opening, which is specially designed for this purpose, so that this pressure equalization limits the arching of the uncoupling membrane into the openings, and coming into contact with the wall of the openings abruptly is avoided. Clattering noises are avoided as a result, and a noiseless functioning of the mount is achieved. In addition, the design according to the present invention has a favorable effect on the service life of the elastically deformable chamber walls of the spring body.

The effect sought to be achieved by the design according to the present invention can be promoted by a profiled cross section of the uncoupling membrane, preferably in the area of the opening, into which the overflow channel opens. Another possibility of influencing the desired effect may be the clamping of the uncoupling membrane not only at the edge, but over the entire surface with a gentle pretension between disks of the cage made of a solid material.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENT

Figure 1:
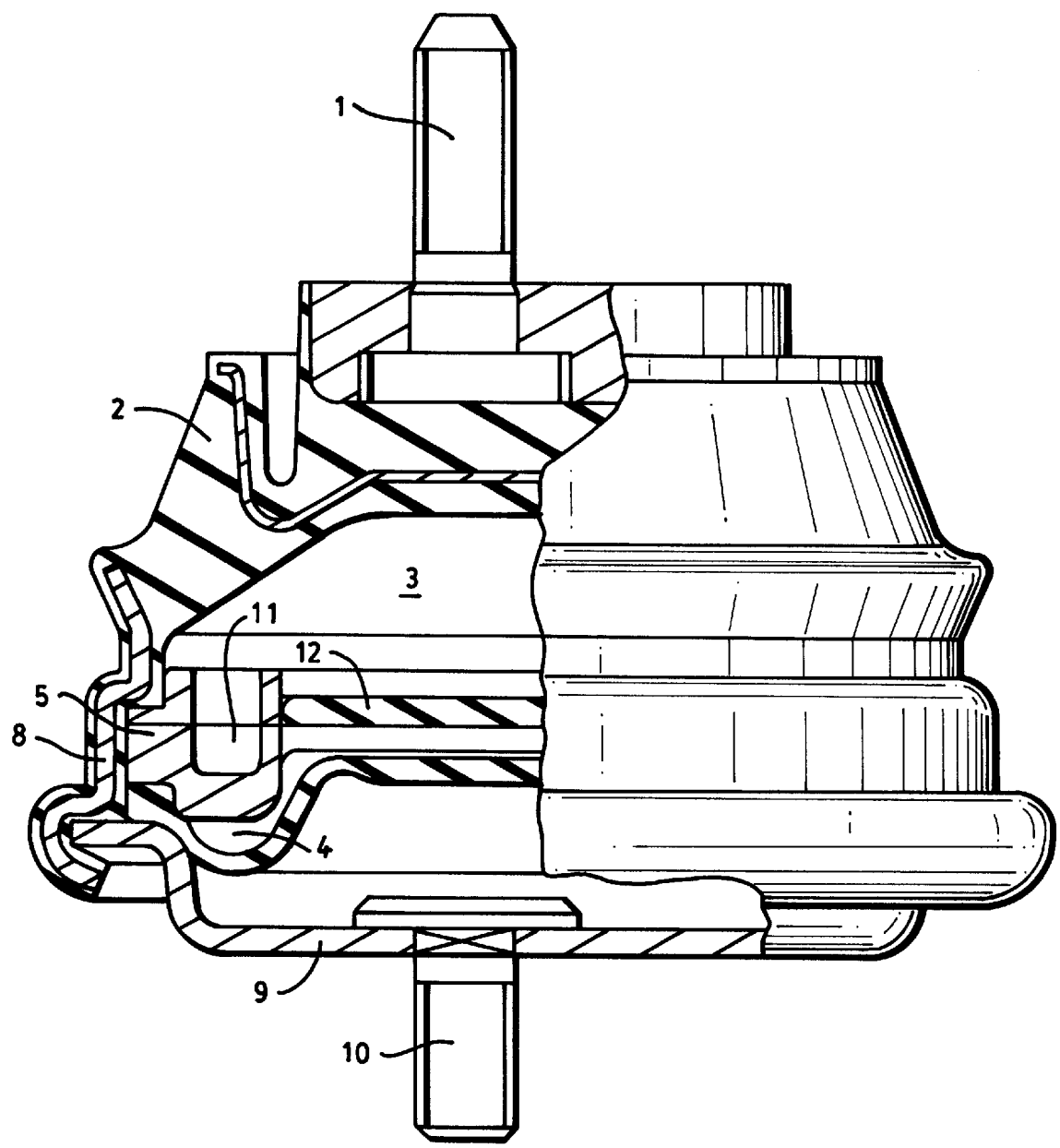
FIG. 1 is an engine mount, half as a view and half as a vertical section in an axial plane.
Figure 3:
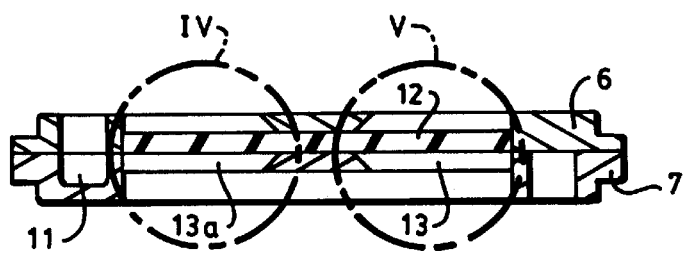
FIG. 3 is a section along line III—III in FIG. 2.
Figure 2:
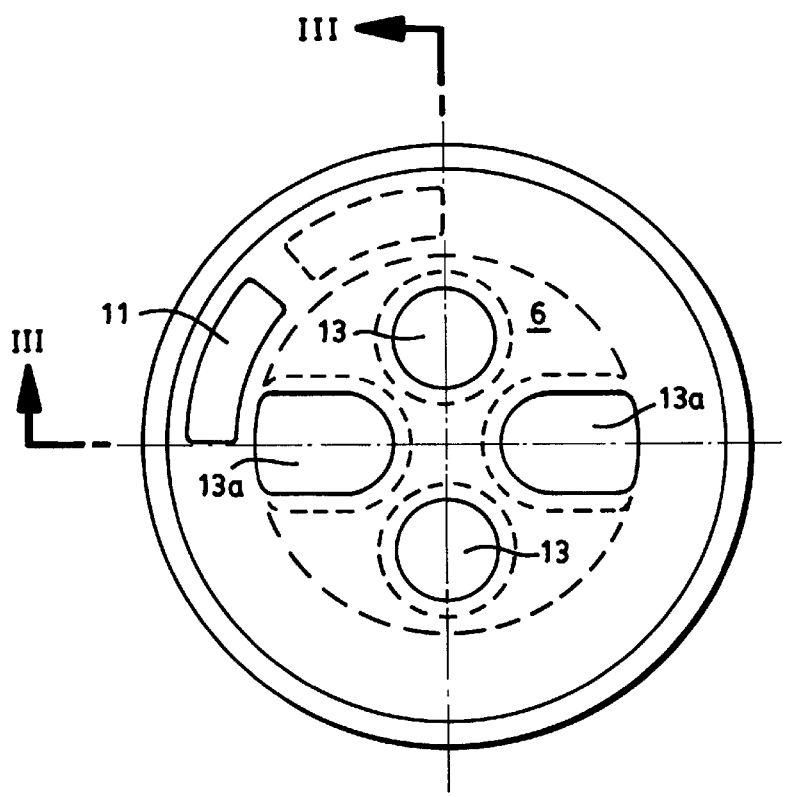
FIG. 2 is a top view of the valve plate.
Figure 4:
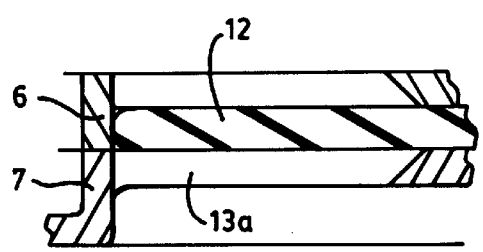
FIG. 4 is a partial section of detail IV from FIG. 3 on a larger scale with the uncoupling membrane released.
Figure 5:
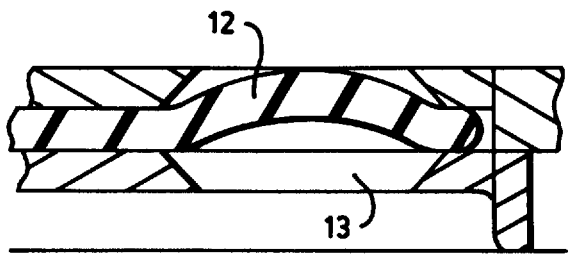
FIG. 5 is a partial section of detail V from FIG. 3 on a larger scale with the uncoupling membrane arching out.
Figure 6:
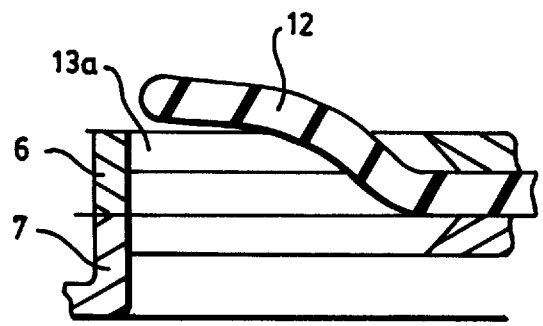
FIG. 6 is a partial section corresponding to FIG. 4 in the characteristic function of the feature of the present invention.
Figure 7:
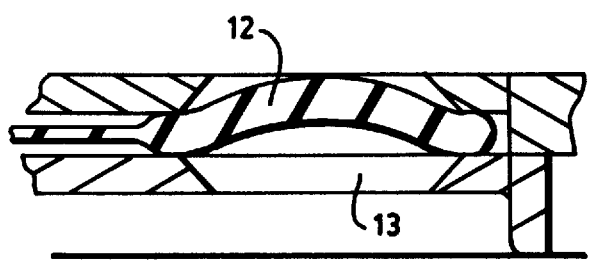
FIG. 7 is a partial section of the valve plate showing the profiled cross section of the uncoupling membrane.

Referring to the drawings and in particular to FIG. 1, two chambers 3 and 4 are arranged in an engine mount under a spring body 2 provided with a fastening pin 1. The two chambers 3 and 4 are filled with a damping fluid, and are clamped at the edge by a valve plate 5 made of disks 6 and 7 twisted together. An upper housing part 8 and a lower housing part 9 are firmly connected to one another at the edge. The lower housing part 9 has an additional fastening pin 10. A throttle channel 11, which connects the two chambers 3 and 4 and alternately makes possible the equalization of the fluid between the two chambers 3 and 4 during high-amplitude vibrations, is located in the valve plate 5 consisting of the two disks 6 and 7. A cage, which accommodates an uncoupling membrane 12 made of an elastically deformable material, e.g., rubber, is formed between the two disks 6 and 7 due to the geometric design of the two disks 6 and 7 of the valve plate 5. The uncoupling membrane 12 is inserted with its edge into a recess between the two disks 6 and 7 with a gentle pretension or force in the axial direction, so that it is pulled out of this recess radially in the inward direction during deformations and can be pushed in again as a consequence of the intrinsic elasticity of its material. Due to the stress distribution in the uncoupling membrane 12, the two disks 6 and 7 forming the cage for the uncoupling membrane 12 have at least three openings 13 each with a cross section tapering from the uncoupling membrane in the outward direction due to oblique limiting surfaces. As is clearly shown in FIG. 5, holes with a conical depression are preferably provided on the side facing the uncoupling membrane 12. At least one of the openings 13 is a passage opening 13a continued radially to the outside to the edge of the uncoupling membrane 12, so that the outer limitation of this opening 13a overlaps the edge of the uncoupling membrane 12, and the uncoupling membrane 12 can arch with its edge into the opening 13a during shock loads acting abruptly on the engine mount. As a result, a connection channel opens between the two chambers 3 and 4. Two mirror-inverted and mutually diametrically arranged openings 13a are continued radially to the outside to the edge of the uncoupling membrane 12 in the example. The other closed or fixed membrane openings 13 are also arranged correspondingly in a mirror-inverted pattern in relation to one another. The action of the openings 13a clearly appears from a comparison of FIGS. 5 and 6 of the drawing. FIG. 6 shows the opening of an overflow channel between the chambers 3 and 4 in the case of shock-like loads. In the exemplary embodiment, the passage openings 13a have a greater extension radially than the closed or fixed membrane openings 13 not continued to the edge of the uncoupling membrane 12. The openings 13a have an approximately oval shape, and the longitudinal axis of the oval shape is directed radially from the center of the disks FIG. 7 shows the profiled cross sections of the uncoupling membrane 12. The uncoupling membrane 12 can be clamped not only at the edge with a gentle pretension or force, but may also be arranged with a gentle pretension or force over the entire surface between the disks 6 and 7.

While specific embodiments of the invention have been shown and described in detail to illustrate the application of the principles of the invention, it will be understood that the invention may be embodied otherwise without departing from such principles.

What is claimed:

1. An engine mount with hydraulic damping for motor vehicles, the mount comprising:

a housing with partially elastically deformable walls, said housing defining first and second chambers;

a damping fluid positioned in said first and second chambers;

a valve plate positioned in said housing and forming a common wall of said first and second chambers, said valve plate including a cage and an elastic uncoupling membrane positioned inside said cage, said cage defining a plurality of fixed membrane openings, said cage contacting said uncoupling membrane in an area completely around said fixed membrane openings without axial clearance, said fixed membrane openings having an axial cross section tapering down in a direction away from said uncoupling membrane due to oblique limiting surfaces, said cage defining a passage opening having an edge continued radially to an outside edge of said uncoupling membrane for movement of said edge of said membrane into said passage opening and forming a channel between said first and second chambers during abruptly occurring differences in pressure between said first and second chambers.

2. An engine mount in accordance with claim 1, wherein: said valve plate defines a throttle channel which connects said first and second chambers.

3. An engine mount in accordance with claim 1, wherein: said passage opening has a greater radial extension than said fixed membrane openings.

4. An engine mount in accordance with claim 1, wherein: said passage opening has a substantially oval shape in a radial direction.

5. An engine mount in accordance with claim 1, wherein: a plurality of said passage openings are arranged substantially symmetrically with respect to a central axis of the engine mount from an axial view, said plurality of passage openings each having a radially outer edge positioned adjacent an outer radial edge of said uncoupling membrane.

6. An engine mount in accordance with claim 1, wherein: said uncoupling membrane has a substantially constant cross section.

7. An engine mount in accordance with claim 1, wherein: said uncoupling membrane has a profiled cross section.

8. An engine mount in accordance with claim 1, wherein: said cage is formed of two disks of solid material, and said disks clamp said uncoupling membrane.

9. An engine mount in accordance with claim 1, wherein: said membrane closes off communication through said fixed membrane openings;

said passage opening and said membrane being of a size and shape to cause said channel to prevent differences in pressure between said first and second chambers which cause said membrane to noisily contact said oblique walls above a predetermined noise level.

10. An engine mount in accordance with claim 9, wherein: said cage includes first and second disks which hold said uncoupling membrane with an axial force to block axial movement of said membrane between said disks, said first and second disks holding said membrane radially movable out from between said first and second disks and into said fixed membrane openings during differences in pressure between said first and second chambers, said membrane being movable into contact with said oblique walls by pressure differences between said first and second chambers;

said edge of said membrane elastically contacts said edge of said passage opening;

said valve plate defines a throttle channel which connects said first and second chambers.

11. An engine mount in accordance with claim 1, wherein: said edge of said membrane elastically contacts said edge of said passage opening.

12. An engine mount comprising:

a housing with partially elastically deformable walls, said housing defining first and second chambers;

a valve plate positioned in said housing and forming a common wall of said first and second chambers, said valve plate including a cage and an elastic uncoupling membrane positioned inside said cage, said cage defining a plurality of fixed membrane openings, said cage holding said uncoupling membrane in an area completely around and closing off said fixed membrane openings without axial clearance, said cage defining a passage opening having an edge positioned adjacent an edge of said membrane for movement of said edge of said membrane away from said edge of said passage opening and forming a channel between said first and second chambers.

13. An engine mount in accordance with claim 12, wherein:
said fixed membrane openings having oblique walls causing an axial cross section of said fixed membrane opening to decrease in a direction away from said uncoupling membrane;
said passage opening and said membrane being of a size and shape to cause said channel to prevent differences in pressure between said first and second chambers which cause said membrane to noisily contact said oblique walls.

14. An engine mount in accordance with claim 12, wherein:
said cage includes first and second disks which hold said uncoupling membrane with an axial force to block axial movement of said membrane between said disks, said first and second disks holding said membrane radially movable out from between said first and second disks and into said openings during differences in pressure between said first and second chambers.

15. An engine mount in accordance with claim 12, wherein:
said edge of said membrane elastically contacts said edge of said passage opening.

16. An engine mount in accordance with claim 12, wherein:
said valve plate defines a throttle channel which connects said first and second chambers.

17. An engine mount in accordance with claim 12, wherein:
said fixed membrane openings have oblique walls causing an axial cross section of said fixed membrane openings to decrease in a direction away from said uncoupling membrane;
said passage opening and said membrane being of a size and shape to cause said channel to prevent differences in pressure between said first and second chambers which cause said membrane to noisily contact said oblique walls above a predetermined noise level.

18. An engine mount in accordance with claim 17, wherein:
said fixed membrane openings have oblique walls causing an axial cross section of said fixed membrane openings to decrease in a direction away from said uncoupling membrane, said membrane being movable into contact with said oblique walls by pressure differences between said first and second chambers;
said passage opening and said membrane being of a size and shape to cause said channel to prevent differences in pressure between said first and second chambers which cause said membrane to noisily contact said oblique walls above a predetermined noise level;
said edge of said membrane elastically contacts said edge of said passage opening;
said valve plate defines a throttle channel which connects said first arid second chambers.

19. An engine mount with hydraulic damping for motor vehicles, the mount comprising:
a housing with partially elastically deformable walls, said housing defining first and second chambers;
a damping fluid positioned in said first and second chambers;
a valve plate positioned in said housing and forming it common wall of said first and second chambers, said valve plate including a cage and an elastic uncoupling membrane positioned inside said cage, said cage defining a plurality of fixed membrane openings, said cage contacting said uncoupling membrane in an area completely around said fixed membrane openings without axial clearance, said fixed membrane openings having an axial cross section tapering down in a direction away from said uncoupling membrane due to oblique limiting surfaces, said cage defining a passage opening having a limitation overlapping an outside edge of said uncoupling membrane for movement of said edge of said membrane into said passage opening and forming a channel between said first and second chambers during abruptly occurring differences in pressure between said first and second chambers.

* * * * *